United States Patent

[11] 3,540,416

| [72] | Inventors | Robert J. Shulick<br>St. Charles, and<br>Harold V. Swanson, Downers Grove,<br>Illinois |
|---|---|---|
| [21] | Appl. No. | 789,140 |
| [22] | Filed | Jan. 6, 1969 |
| [45] | Patented | Nov. 17, 1970 |
| [73] | Assignee | Babson Bros. Co.<br>a corporation of Illinois |

[54] MILKING APPARATUS
3 Claims, 4 Drawing Figs.
[52] U.S. Cl.................................................. 119/14.37,
119/14.39
[51] Int. Cl.................................................. A01j 07/00
[50] Field of Search.................................... 119/14.37,
14.39, 14.38

[56] References Cited
UNITED STATES PATENTS

| 1,891,983 | 12/1932 | Hodson......................... | 119/14.37 |
| 2,045,454 | 7/1936 | Erling........................... | 119/14.37 |
| 2,460,426 | 2/1949 | Maes............................ | 119/14.37 |

Primary Examiner—Aldrich F. Medbery
Attorney—Hofgren, Wegner, Allen, Stellman and McCord ABSTRACT: The combination of a milking apparatus having a pulsator valve assembly which includes a housing having a plurality of nipples fixed to and extending outwardly therefrom for connection to appropriate vacuum hoses. A lid is removably and rotatably mounted on a portion of the housing adjacent at least one of the nipples and a handle is fixed to the lid for suspending the milking apparatus beneath a cow from an appropriate support. A latch member is slidably mounted on the lid for selective engagement with the one nipple whereby the nipple provides an abutment for the latch member to prevent rotation of the lid relative to the pulsator housing.

Patented Nov. 17, 1970 3,540,416

INVENTORS
Robert J. Skulick
Harold V. Swanson

BY Hofgren, Wegner, Allen, Stellman & McCord
ATTORNEYS 3,540,416

MILKING APPARATUS

BACKGROUND AND SUMMARY OF THE INVENTION

This invention relates to a suspended milker having a pulsator valve assembly, and more particularly to means for preventing accidental removal of a lid portion of the pulsator.

The invention is concerned with a type of milking apparatus, generally known as a "suspended milker", which has a cantilever handle for suspending the milking apparatus from a surcingle or other support beneath a cow during use. The milking apparatus has a receptacle portion such as a "breaker cup" or the like for receiving milk from four teat cup assemblies. A pulsator valve assembly is mounted on top of the receptacle. As shown in the U.S. Pat. No. to Schilling 3,236,208, assigned to the assignee of this invention, one type of pulsator valve assembly has a lid removably and rotatably mounted on a housing portion of the valve assembly to hold certain interior components, such as a diaphragm, in position for proper operation of the valve. In the past, the cantilever handle of the suspended milker normally was secured to the receptacle portion of the milking apparatus. It has been found that in certain situations, particularly where the receptacle or "breaker cup" is relatively small in size, it would be desirable to secure the cantilever handle to the top of the milking apparatus, which would mean securing the handle directly to the rotatably mounted lid of the pulsator valve assembly. This invention is directed to providing such a milking apparatus with the cantilever handle secured to the pulsator lid and particularly to one in which means are provided to prevent accidental rotation of the pulsator lid relative to the pulsator housing.

More particularly, this invention contemplates providing a latch member slidably mounted on the side of the lid portion of the pulsator valve assembly for reciprocating movement into and out of engagement with one of the connector nipples which extends outwardly from the pulsator valve assembly, to prevent rotation of the lid relative to the pulsator valve housing. The latch member reciprocates generally perpendicular to the direction of rotation of the lid and is provided with a notch of a size to embrace the nipple whereby opposite faces of the notch provide abutment surfaces to prevent rotation of the lid in either direction.

Other features and advantages of the invention will be apparent from the following detailed description taken in connection with the accompanying drawings.

DETAILED DESCRIPTION OF THE INVENTION

Figure 1:
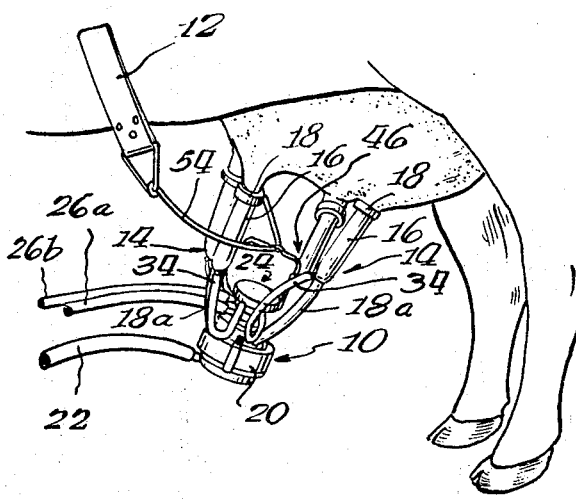
FIG. 1 is a perspective view of a milking apparatus embodying the invention in use on a cow and hanging from a surcingle adapted to be suspended from the back of the cow.
Figure 3:
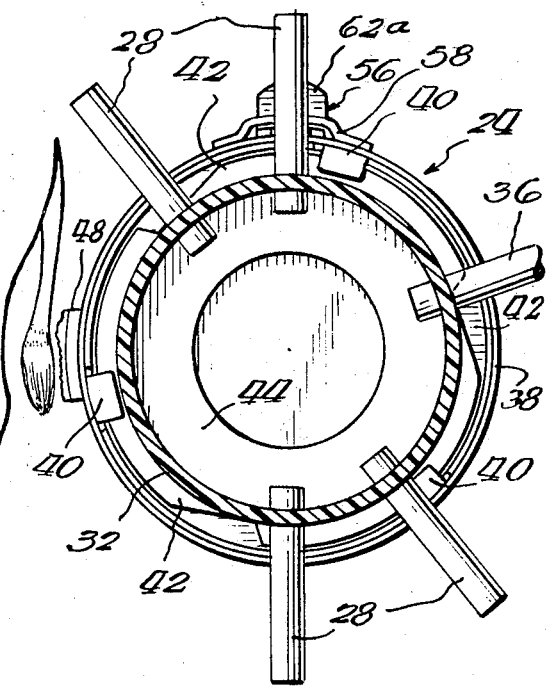
FIG. 3 is a sectional view taken generally along the line 3–3 in FIG. 2.
Figure 2:
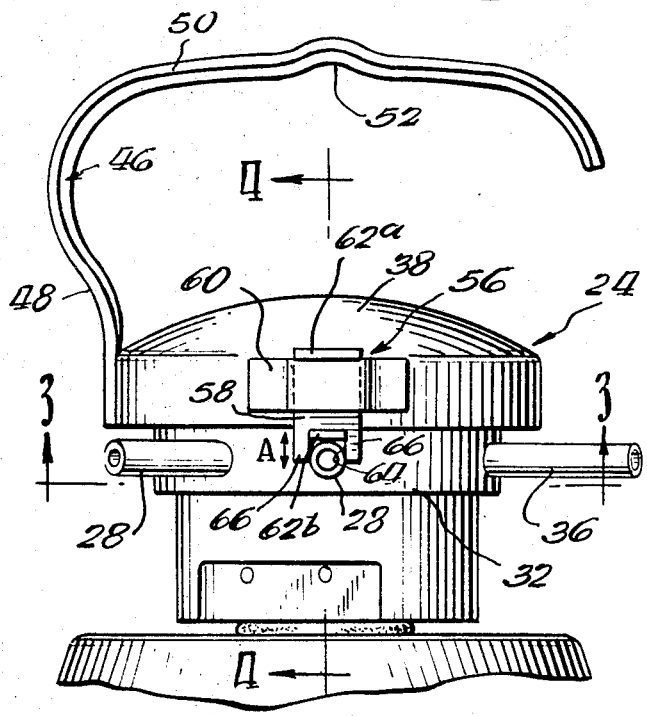
FIG. 2 is an elevational view of the pulsator valve assembly of the milking apparatus and illustrating the latch means of this invention.
Figure 4:
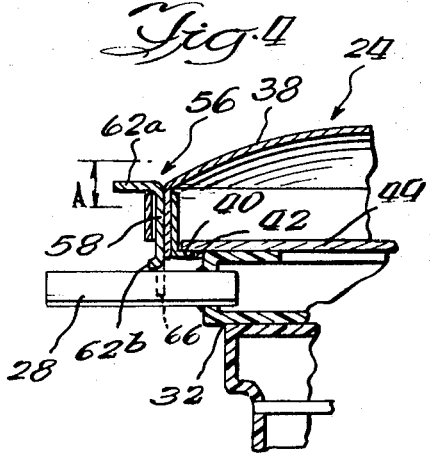
FIG. 4 is a partial sectional view taken generally along the line 4–4 in FIG. 2.

In the particular embodiment of the invention illustrated in FIG. 1, a milking apparatus, generally designated 10, is suspended beneath a cow on a surcingle 12 adapted to be suspended from the back of the cow. The milking apparatus includes a teat cup assembly comprising four teat cup units, generally designated 14, each of which includes a rigid outer shell 16 and a flexible inner liner or inflation 18 which has a stem portion 18a defining a milk passage and connected with a nipple on the cover of a receptacle 20 of the milking apparatus 10. A milk hose 22 is connected from the bottom of the receptacle 20 to an evacuated milk line, bucket or other receiving station (not shown in the drawings) in a known manner. A pulsator valve assembly, generally designated 24, is mounted on top of the milker apparatus 10 and is connected to hoses 26a and 26b. Hose 26a is a vacuum hose, establishing a continuous vacuum in the pulsator and hose 26b is a vacuum control hose. Referring to FIGS. 2–4, four nipples 28 are fixed to and extend outwardly from a housing portion 32 of the pulsator valve assembly 24 for connection with pulsator hoses 34 (FIG. 1) leading from the pulsator valve assembly to the four teat cup assemblies to control the application of vacuum and air to the teat cups. A fifth nipple 36 extends radially outwardly from the housing portion 32 of the pulsator valve assembly for connection with the vacuum control hose 26b.

The details of construction and operation of the pulsator valve assembly are known in the art and are not shown or described herein. For such details, reference may be made to the Schilling U.S. Pat. No. 3,236,208, referred to above.

Referring again to FIGS. 2 through 4, the pulsator valve assembly 24 is provided with a lid 38 which is removably and rotatably mounted on the housing portion 32 of the valve assembly. The lid 38 has a plurality of fingers 40 (FIGS. 3 and 4) which are inturned beneath camming surfaces 42 on the underside of the periphery of a plate 44 of the pulsator valve assembly. Turning the lid 38 forces it downwardly holding the pulsator valve assembly, including certain interior components thereof (not shown in the drawings) in place.

Secured to the lid 38 and extending upwardly therefrom is a cantilever handle, generally designated 46, which has a portion 48 extending vertically upwardly from the side of the lid and a top portion 50 bent back over the top of the lid. The portion 50 is provided with at least one recess or notch 52 adapted to be placed in a bow 54 (FIG. 1) provided on the bottom of the surcingle 12 suspended from the back of the cow. Thus it can be seen that with the handle 46 secured to the lid 38, the lid must withstand the forces exerted on the milking apparatus when suspended beneath the cow during use. Oftentimes a cow will kick the apparatus during use, tending to cause the lid 38 to rotate off of the pulsator valve assembly and disrupt operation of the milking assembly. In addition, the milking apparatus is carried, manipulated and stored by the handle 46, further increasing the possibility of accidental removal of the lid from the assembly.

A latch means, generally designated 56, is mounted on the lid 38 of the pulsator valve assembly for selective engagement with one of the nipples 28 or the nipple 36 which are fixed to the housing portion 32 of the pulsator valve assembly, to prevent rotation of the lid relative to the housing. The latch means comprises a latch member 58 slidably mounted on the side of the lid 38 by a rigid support strip 60 which permits reciprocating movement of the latch member 58 in the direction of arrows A (FIGS. 2 and 4). The latch member has a pair of projections 62a and 62b extending outwardly from the lid 38 for abutment against the upper and lower edges of the strip 60 to define the extent to reciprocating movement of the latch member 58. The projection 62a acts as a lip for grasping to manipulate the latch member. Referring to FIG. 2, the lower edge of the latch member has a notch 64 cut therein to define a pair of legs 66 which abut against opposite sides of the one nipple 28 to prevent rotation of the lid 38 in either direction relative to the housing portion 32 of the pulsator valve assembly 24, and thereby prevent accidental removal of the lid during use on the cow, or while manipulating or carrying the milking apparatus.

The foregoing detailed description has been given for clearness of understanding only and no unnecessary limitations should be understood therefrom as some modifications will be obvious to those skilled in the art.

We claim:

1. In a milking apparatus having a pulsator valve assembly which includes a housing portion having a plurality of nipples fixed to and extending outwardly therefrom for connection to appropriate hoses, a lid removably and rotatably mounted on a portion of the housing adjacent at least one of the nipples, a handle fixed to said lid for suspending the milking apparatus beneath a cow from an appropriate support, and a latch means on said lid for selective engagement with said one nipple to prevent rotation of said lid relative to the housing portion of said pulsator valve assembly.

2. The milking apparatus of claim 1 wherein said lid rotates relative to said housing portion in a direction generally tangentially of said one nipple and wherein said latch means comprises a latch member slidably mounted on said lid for reciprocating movement generally perpendicular to the direction of rotation of the lid, said latch member being provided with means defining abutment surfaces for engaging said one nipple to prevent rotation of said lid relative to said housing portion.

3. The milking apparatus of claim 2 wherein said reciprocating latch member has means defining a notch of a size to embrace said one nipple, opposite sides of said notch defining said abutment surfaces to prevent rotation of said lid in either direction relative to said housing portion.